US 6,201,965 B1

United States Patent
Mizell et al.

(10) Patent No.: US 6,201,965 B1
(45) Date of Patent: *Mar. 13, 2001

(54) TELECOMMUNICATION SUBSCRIBER CONNECTION USING A DOMAIN NAME SYSTEM

(75) Inventors: Jerry L. Mizell, Plano; David J. Lauson, Allen, both of TX (US)

(73) Assignee: Nortel Networks Limited, Montreal (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/188,964

(22) Filed: Nov. 10, 1998

(51) Int. Cl.[7] ............................................ H04Q 7/20
(52) U.S. Cl. ...................... 455/433; 455/445; 370/475
(58) Field of Search .................... 455/462, 445, 455/517, 433, 560; 370/328, 401, 349, 389, 475

(56) References Cited

U.S. PATENT DOCUMENTS

| | | | | |
|---|---|---|---|---|
| 5,159,592 | * | 10/1992 | Perkins .................................. | 370/401 |
| 5,590,133 | * | 12/1996 | Billstrom et al. ..................... | 455/332 |
| 5,729,531 | * | 3/1998 | Raith et al. ........................... | 370/252 |
| 6,047,194 | * | 4/2000 | Anderson .............................. | 455/466 |
| 6,061,341 | * | 5/2000 | Anderson et al. .................... | 370/338 |

FOREIGN PATENT DOCUMENTS

WO 98/32301    7/1998   (WO) .

OTHER PUBLICATIONS

Stevens, W. Richard, "TCP/IP Illustrated: vol. 1, The Protocols ISBN 0201633469" 1994, Addison–Wesley, Reading, Massachusetts 01867 USA, pp. 187–208d.

* cited by examiner

Primary Examiner—Curtis Kuntz
Assistant Examiner—M. Ramakrishnaiah
(74) Attorney, Agent, or Firm—Haynes and Boone, LLP

(57) ABSTRACT

A system and method for facilitating a telecommunication subscriber connection using a domain name system is disclosed. The system, which is part of a DNS server, supports connection to a mobile terminal through a data network and includes multiple connections to external devices or systems, although one or more of the connections may be serviced by a single link. The connections link the system to the data network, to a home location register ("HLR") associated with the terminal and to a mobile switch associated with the terminal. Upon initiation of a query to the DNS server through the PDN, the DNS server signals the HLR for the identification of the switch that is associated with the mobile terminal. The HLR returns an identifier for the switch and the DNS server then requests the switch to provide an address for the mobile terminal. The switch establishes a connection with the mobile terminal and provides a temporary address through a network interface system such as an interworking function. The switch then returns this new address to the DNS server.

26 Claims, 2 Drawing Sheets

TELECOMMUNICATION SUBSCRIBER CONNECTION USING A DOMAIN NAME SYSTEM

TECHNICAL FIELD

The invention relates generally to call processing techniques for a telecommunications network and, more particularly, to a system and method for completing a data network connection to a data terminal.

BACKGROUND OF THE INVENTION

There are many types of calls that are being performed in various telecommunications networks. The public switched telephone network ("PSTN") handles voice calls between two voice terminals and has been adapted to handle data calls between two data terminals through use of modems and the like. Likewise, many data networks, such as the internet, handle data and voice calls between two terminals.

Wireless networks are also commonplace, and are typically connected to the PSTN through one or more mobile switches. Furthermore, the wireless networks can be connected to a data network through interface systems such as one using data interworking function technology. In this way, a mobile terminal operating in a wireless network can connect to a remote terminal through the wireless network and further through the PSTN or the data network.

For a user of a mobile terminal to initiate a data call, the mobile terminal must either use a modem for connecting through the PSTN or use an interface system for connecting through the data network. For example, a user of a laptop computer may wish to connect to a remote terminal. In the present example, the laptop is configured to use a code division multiple access ("CDMA") technique for communication in a wireless network. The laptop establishes a wireless connection to a base station controller ("BSC"), which is further connected to a mobile switching center ("MSC"), both of which are components of the wireless network. The MSC must then direct the call to an interface system such as an internet service provider or an interworking function system ("IWF").

The IWF provides two functions. First of all, it establishes control signal communications with the laptop using a predetermined protocol stack. The protocol stack is commonly used to support various communications in the wireless network. Secondly, the IWF supports a data connection to the remote data terminal. The data connection can either be through the PSTN or through a data network.

Once the call reaches the data network, the laptop queries a server by providing it with a name that identifies the remote data terminal. The server then performs a "look up" routine in a database and returns an address that identifies the physical location of the remote terminal.

A problem exists because the above-described description is only one-way. That is, there is no way for the remote terminal to contact the mobile terminal. This is because the mobile terminal does not have a physical location. In fact, the mobile terminal can be connected to one of many different MSCs in one of many different wireless networks. Therefore, there is no way to "look up" an address for the mobile terminal.

What is needed is a system and method for allowing a user to contact a mobile terminal in a wireless telecommunications network.

SUMMARY OF THE INVENTION

The present invention, accordingly, provides a system and method for allowing a user to contact another device through a data network. In one embodiment, the system supports connection to a mobile data terminal through the data network. The system includes multiple connections to external devices or systems, although one or more of the connections may be serviced by a single link. The connections link the system to the data network, to a register associated with the terminal and to a switch associated with the terminal. For the sake of example, the system is a domain name system ("DNS") server, the register is a home location register ("HLR"), the switch is a mobile switch, and the data network is a packet data network ("PDN").

Upon initiation of a query to the DNS server through the PDN, the DNS server signals the HLR for the identification of the switch that is associated with the mobile terminal. The HLR returns an identifier for the switch and the DNS server then requests the switch to provide an address for the mobile terminal. If the mobile terminal is already connected to the PDN, the switch simply returns the address already assigned to the terminal. Otherwise, the switch establishes a connection with the mobile terminal and provides a temporary address through a network interface system such as an interworking function. The switch then returns this new address to the DNS server. The DNS server, in turn, provides this address in response to the initial query from the PDN.

In one embodiment, the mobile switch, HLR and interworking function establish a CDMA circuit switched data path between the mobile terminal and the data network.

In another embodiment, the mobile switch, HLR and interworking function establish a CDMA fast connect data path between the mobile terminal and the data network.

In yet another embodiment, the mobile switch, HLR and interworking function establish a time division multiple access ("TDMA") data path between the mobile terminal and the data network.

In still another embodiment, the mobile switch, HLR and interworking function establish a global system mobile ("GSM") data path between the mobile terminal and the data network.

In yet another embodiment, the interworking function establishes a hybrid data path between the mobile terminal and the data network.

DESCRIPTION OF A PREFERRED EMBODIMENT

Figure 1:
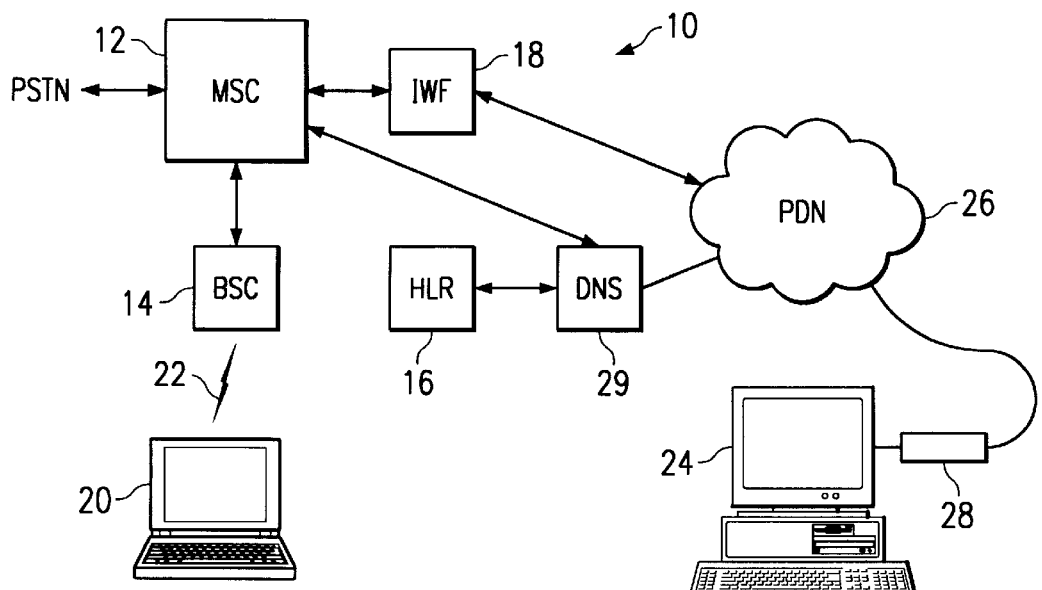
FIG. 1 is a functional block diagram of a wireless telecommunications network which connects to a data network for implementing features of the present invention.

Turning now to the drawings, in FIG. 1, the reference numeral 10 designates a telecommunications system 10. For the sake of example, the network 10 is a wireless communications system such as either a cellular network or a personal communication service network that utilizes CDMA technology. The network 10 includes several components, including an MSC 12, a BSC 14, an HLR 16, and an IWF 18. It is understood that the components described in FIG. 1 are merely exemplary, using terms that are well known in the telecommunications industry to represent only one type of component.

The components of the network 10 are connected in various methods, such as signaling system 7 ("SS7"), Ethernet, and so forth. To accommodate the various methods, the interconnections are illustrated in a functional sense. The existence and operation of certain signaling systems and/or intelligent networks are well known to facilitate communications between the different components shown herein. Therefore, it is understood that the descriptions of the components and interconnections therebetween are meant for exemplary purposes and should not further limit the invention.

A first data device 20 is connected through a wireless link 22 to the network 10 using an IS-99 wireless communications device (not shown). IS-99 is a CDMA Circuit Switched Data Specification that defines how a CDMA mobile terminal establishes a circuit call through a modem pool of an IWF. Other CDMA specifications provide similar functionality, including IS-707. A second data device 24 is connected to a data network 26 using a modem 28. For the sake of further example, the first data device 20 is a laptop computer, the second data device 24 is a desktop computer, and the data network 26 is a packet data network ("PDN"). It is understood that the IS-99 wireless communications device and the modem 28 are also provided for the sake of example.

Figure 2A:
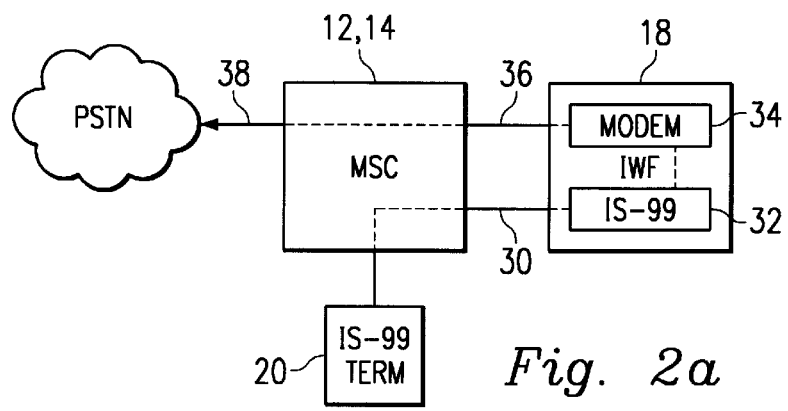
FIGS. 2a and 2b provide examples of data paths that utilize CDMA technology.
Figure 2B:
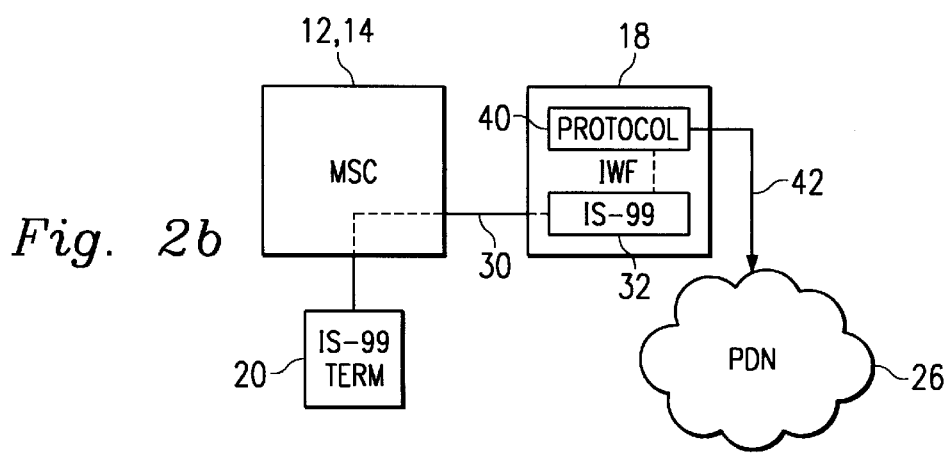

The IWF 18 is able to establish a data path to the PDN 26. FIGS. 2A and 2B below describe examples of how the IWF establishes such a data path. Additional connections or types of connections may also be utilized by the IWF 18 in implementing the present invention. Once a data path is established, a temporary address can be assigned to the first data unit 20.

The HLR 16 is a database for storing customer profile information such as features, dialing capabilities, and a home serving area identification. In the present example, the home serving area identifies the MSC 12 in which the first data device 20 is located. One example of an MSC is a DMS-MTX MSC manufactured by Northern Telecom Ltd. of Montreal, Canada. The operation of the HLR 16 and the MSC 12, along with any other switching centers and databases not shown, is well known and understood in the art.

The PDN 26 can be any type of data network, including the internet, a corporate intranet, and so forth. The PDN 26 includes a domain name system ("DNS") server 28 for translating back and forth between an internet protocol ("IP") address (e.g., 123.456.789) and a domain name (e.g., xyz.com). The DNS server 28 is connected to the network 10, such as through an SS7 link or a link through the PDN 26.

Referring to FIG. 2A, an example of a CDMA circuit switched data path connection is illustrated using the components of FIG. 1. The first data device 20 is equipped with an IS-99 wireless terminal for connection with the BSC 14 and the MSC 12. The MSC 12 establishes a data path (e.g. using a data bus) and a signaling path (e.g., using Ethernet), collectively designated with a bus 30, to the IWF 18. The IWF terminates the signaling path with an IS-99 device and routes the data to a modem-like device 34. The data from the modem device 34 is then sent back to the MSC 12 on a bus 36 and from there to the PSTN through a trunk 38. Once connected to the PSTN, several different gateways are available to the PDN 26, such as through an internet service provider (not shown).

Referring to FIG. 2B, an example of a CDMA fast connect, or hybrid data call, path connection is illustrated, also using the components of FIG. 1. As in FIG. 2A, the first data device 20 is equipped with an IS-99 wireless terminal for connection with the BSC 14 and the MSC 12. The MSC 12 establishes a data path (e.g. using a data bus) and a signaling path (e.g., using Ethernet), collectively designated with a bus 30, to the IWF 18. However, as distinguished from FIG. 2A, the IWF terminates the signaling path with an IS-99 device and routes the data to a protocol device 40 that is suited for the data network 26. Therefore, the call does not use any modem of the IWF 18. In the present example, the protocol device will be used to provide packet data to the PDN 26. The data from the protocol device 40 is sent to the PDN 26 over a bus 42.

Figure 3:
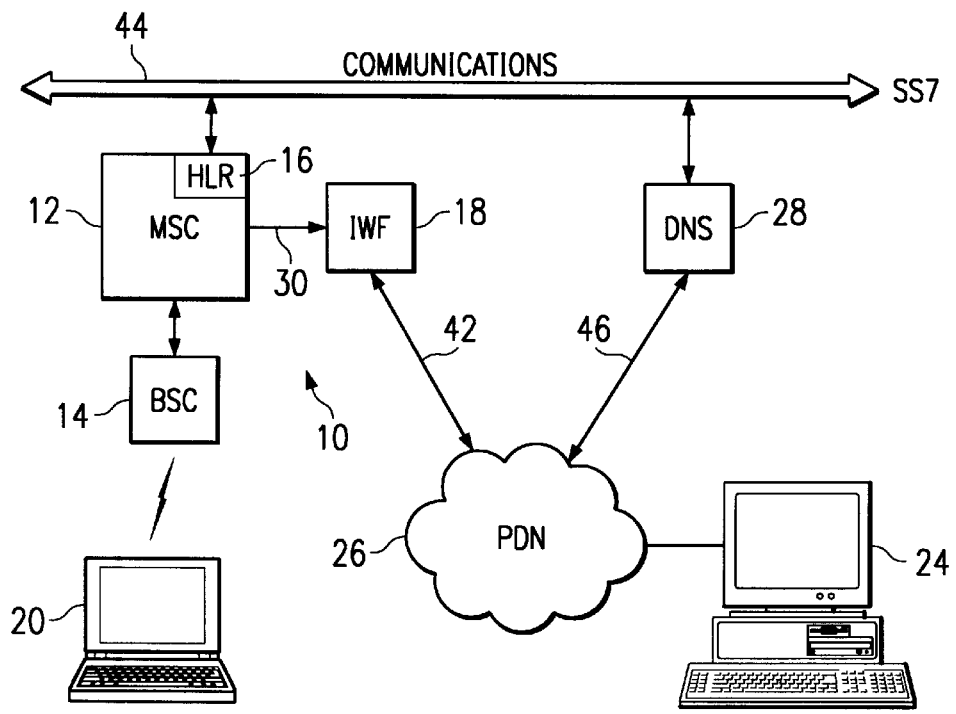
FIG. 3 is a block diagram of the system of FIG. 1 implemented in a CDMA environment.

Referring to FIG. 3, an example of a CDMA system is shown using the components of FIG. 1. In this example, the HLR 16 is included with the MSC 12, although this is not always the case. The DNS server 28 is connected to the HLR 16 and the MSC 12 using an SS7 link 44. Both the IWF 18 and the DNS server 28 are connected directly to the PDN 26 through data buses 42 and 46, respectively.

Figure 4:
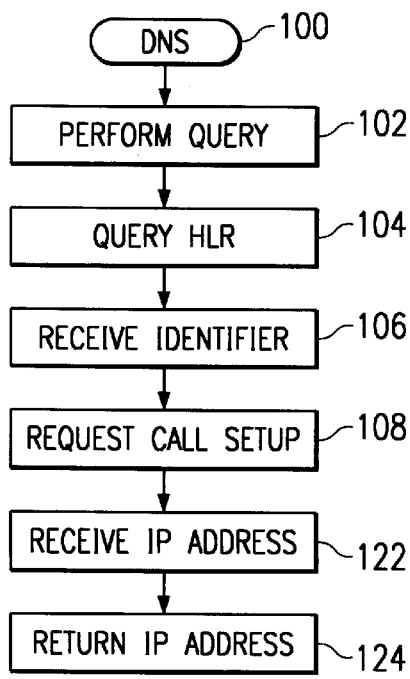
FIG. 4 is a flow chart of a method for providing an internet protocol address to a domain name server in the data network of FIG. 1.

Referring to FIG. 4, a method 100 is used to route a call from the second data device 24 to the first data device 20. The method 100 is performed by the DNS server 28. However, before the method 100 is performed, the DNS server 28 has stored therein an identifier for recognizing the first data device 20. The identifier may be a specialized IP address for mobile terminals. The specialized IP address only defines a particular subscriber account and does not define a definite location. It is understood that the DNS server 28 may use alternate look-up methods for recognizing the first data device 20.

At step 102, the DNS server 28 receives a DNS query from the second data device 24 specifying the domain name for the first data device 20. In the present example, this may be a Get_Host_by_Name query. The DNS server 28 performs the query and locates the identifier. However, as discussed above, the identifier designates that the requested target is a mobile terminal and therefore does not provide a definite location.

At step 104, the DNS server 28 queries the HLR 16 to locate the first data device 20. In the present example, this may be an IS-41_Location_Query via an SS7 link. At step 106, the DNS server receives a switch identifier from the HLR, which in the present example identifies the MSC 12.

At step 108, the DNS server 28 requests that the identified switch establish a link to the first data device 20. In furtherance of the present example, the DNS server 28 performs a Call_Setup_Request to the MSC 12.

Figure 5:
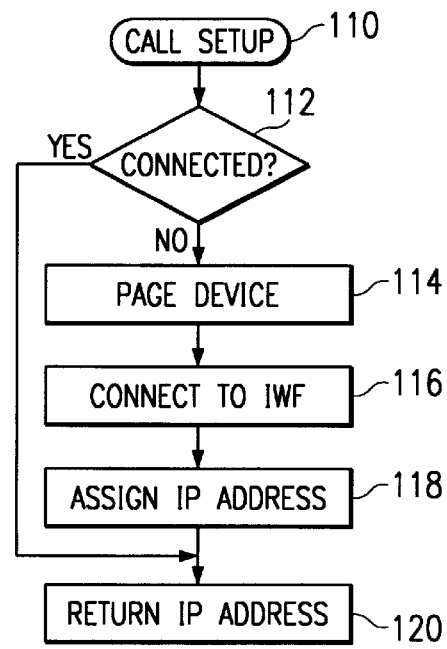
FIG. 5 is a flow chart of a method for determining the internet protocol address of FIG. 4.

Referring to FIG. 5, upon receipt of the request to establish a link, the MSC 12 performs a procedure 110. At step 112, the MSC 12 determines if the first data device 20 is already connected to the IWF 18 and has an IP address. If not, execution proceeds to step 114 where the MSC 12 pages the first data device 20. At step 116, the MSC 12 puts the first data device 20 on a channel and sets up a fast connect call to the IWF 18. At step 118, the IWF assigns the first data device 20 a temporary IP address and returns that address to the MSC 12. Once the MSC 12 has an IP address for the first data device 20, then at step 120, the MSC responds to the request from the DNS server 28 (see step 108, FIG. 4) with the new IP address.

Referring again to FIG. 4, at step 122, the DNS server 28 receives the IP address from the MSC 12 and at step 124, responds to the Get_Host_by_Name query with the new IP address. The second data device 24 now has an IP address to perform a conventional end-to-end connection with the first data device 20.

Although illustrative embodiments of the invention have been shown and described, other modifications, changes, and substitutions are intended in the foregoing disclosure. For example, the second data device 24 may also be a wireless device. Furthermore, functionality performed by certain components, such as the DNS server, may instead be performed by a group of devices that, in essence, work together to achieve the same goals. Further still, while the connection protocol is disclosed in conjunction with the completion of a call in a CDMA wireless network, the disclosed protocol is equally suitable for use in conjunction with other wireless networks, for example, the global system mobile ("GSM") network or a time division multiple access ("TDMA") network. Accordingly, it is appropriate that the appended claims be construed broadly and in a manner consistent with the scope of the invention.

What is claimed is:

1. A system for supporting connection to a mobile terminal through a data network, the mobile terminal not having a currently assigned address, the system comprising:
    a connection to the data network;
    a connection to a register associated with the mobile terminal;
    a connection to a switch associated with the mobile terminal; and
    if a query for signaling the register for the identification of the switch is received from the data network, requesting the switch to initiate a link with the mobile terminal and to provide, by an interworking function associated with the switch, an address for the mobile terminal, and forwarding the address to the data network, wherein the switch establishes a data path and a signaling path to the interworking function which terminates the signaling path with a protocol device associated with the mobile terminal and routes data to one of either a modem device or a protocol device suited for the data network, and wherein the data from the modem device is forwarded to a public switched telephone network via the switch and the data from the protocol device suited for the data network is forwarded to the data network.

2. The system of claim 1 wherein the register is a home location register and the switch is a mobile switch.

3. The system of claim 1 wherein the data network is a packet data network.

4. The system of claim 1 wherein the address is a temporary address provided by the interworking function associated with the switch.

5. The system of claim 4 wherein the data network is a packet data network.

6. A method for providing a connection to a device using a domain name system ("DNS") server, comprising
    receiving a DNS query to return an address associated with a domain name;
    querying a register associated with the device;
    receiving an identifier from the register identifying a switch associated with the device;
    requesting the switch to initiate a link with the device and to assign, by an interworking function associated with the switch, an address to the device, wherein the switch establishes a data path and a signaling path to the interworking function which terminates the signaling path with a protocol device associated with the device and routes data to one of either a modem device or a protocol device suited for a data network, and wherein the data from the modem device is forwarded to a public switched telephone network via the switch and the data from the protocol device suited for the data network is forwarded to the data network;
    requesting the address for the device from the switch;
    receiving the address from the switch; and
    providing the address to complete the DNS query.

7. The method of claim 6 wherein the device is a mobile device, the register is a home location register, and the switch is a mobile switch.

8. The method of claim 6 wherein the data network is a packet data network.

9. The method of claim 6 wherein the address is a temporary address established by a interworking function associated with the switch.

10. The method of claim 9 wherein the device is a mobile device, the register is a home location register, and the switch is a mobile switch.

11. The method of claim 10 wherein the mobile switch checks to see if the address already is assigned to the mobile device.

12. The method of claim 10 wherein the mobile switch initiates the link by performing a call setup request to the mobile device and requests the interworking function to establish the temporary address.

13. The method of claim 12 wherein the interworking function establishes a CDMA circuit switched data path between the mobile terminal and the data network.

14. The method of claim 12 wherein the interworking function establishes a CDMA fast connect data path between the mobile terminal and the data network.

15. The method of claim 12 wherein the interworking function establishes a TDMA data path between the mobile terminal and the data network.

16. The method of claim 12 wherein the interworking function establishes a GSM data path between the mobile terminal and the data network.

17. The method of claim 12 wherein the interworking function establishes a hybrid data path between the mobile terminal and the data network.

18. A computer product for facilitating a data connection to a data device comprising:
    means for receiving an address query to return an address associated with a domain name;
    means for querying a register associated with the device;
    means for receiving an identifier for identifying a switch associated with the device;
    means for requesting the switch to initiate a call to the device;
    means for requesting, from an interworking function associated with the switch, an address for the device from the switch, wherein the switch establishes a data path and a signaling path to the interworking function which terminates the signaling path with a protocol device associated with the device and routes data to one of either a modem device or a protocol device suited for a data network, and wherein the data from the modem device is forwarded to a public switched telephone network via the switch and the data from the protocol device suited for the data network is forwarded to the data network;
    means for receiving the address from the switch; and
    means for providing the address to complete the address query.

19. The computer product of claim 18 wherein the device is a mobile device, the register is a home location register, and the switch is a mobile switch.

20. The computer product of claim 18 wherein the data network is a packet data network.

21. The computer product of claim 18 wherein the address is a temporary address established by a interworking function associated with the switch.

22. The computer product of claim 21 wherein the device is a mobile device, the register is a home location register, and the switch is a mobile switch.

23. The computer product of claim 22 wherein the means for providing an address checks to see if the address already is assigned to the mobile device.

24. The computer product of claim 22 wherein the mobile switch requests the interworking function to establish the temporary address.

25. The computer product of claim 24 wherein the interworking function establishes one of either a CDMA circuit switched data path, a CDMA fast connect data path, a TDMA data path, or a GSM data path between the mobile device and the data network.

26. The computer product of claim 24 wherein the interworking function establishes a hybrid data path between the mobile device and the data network.

* * * * *